US011023972B2

(12) United States Patent
Hamada et al.

(10) Patent No.: US 11,023,972 B2
(45) Date of Patent: Jun. 1, 2021

(54) FINANCIAL TRANSACTION MANAGEMENT SYSTEM AND FINANCIAL TRANSACTION MANAGEMENT METHOD

(71) Applicant: NOMURA RESEARCH INSTITUTE, LTD., Tokyo (JP)

(72) Inventors: Hirotaka Hamada, Tokyo (JP); Minoru Monda, Tokyo (JP); Ayumu Kaneko, Tokyo (JP); Shumpei Sawato, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 14 days.

(21) Appl. No.: 16/369,693

(22) Filed: Mar. 29, 2019

(65) Prior Publication Data
US 2019/0325518 A1    Oct. 24, 2019

Related U.S. Application Data

(63) Continuation of application No. PCT/JP2017/000673, filed on Jan. 11, 2017.

(51) Int. Cl.
*G06Q 40/00*  (2012.01)
*G06Q 40/04*  (2012.01)
(Continued)

(52) U.S. Cl.
CPC ............ *G06Q 40/04* (2013.01); *G06Q 20/02* (2013.01); *G06Q 20/405* (2013.01)

(58) Field of Classification Search
CPC ....... G06Q 40/04; G06Q 20/02; G06Q 20/405
See application file for complete search history.

(56) References Cited

U.S. PATENT DOCUMENTS 4,694,397 A * 9/1987 Grant ................. G06Q 20/02
235/379
8,452,702 B1 * 5/2013 O'Donnell ........... G06Q 40/02
705/39
(Continued)

FOREIGN PATENT DOCUMENTS

JP    2002-513975    5/2002
JP    2002-358414    12/2002
(Continued)

OTHER PUBLICATIONS

Anonymous, "Multilateral Netting," www.investopedia.com/terms; 2017 (Year: 2017).*
(Continued)

*Primary Examiner* — Alexander G Kalinowski
*Assistant Examiner* — William B. Bunker

(57) ABSTRACT

A TPC apparatus 12 is configured to be able to access a possessed quantity storage unit that stores a possessed quantity of an asset in a first entity and a possessed quantity of an asset in a second entity and a transaction information storage unit that stores first transaction information and second transaction information indicating a transaction of an asset between the first entity and the second entity. The TPC apparatus 12 determines whether or not a net base transaction based on the first transaction information and the second transaction information is possible by the possessed quantity of an asset in at least one of the first entity and the second entity. The TPC apparatus 12 pays for a transaction indicated by the first transaction information on a gross basis and pays for a transaction indicated by the second transaction information on a gross basis when it is determined that the net base transaction is possible.

4 Claims, 10 Drawing Sheets

(51) Int. Cl.
*G06Q 20/02* (2012.01)
*G06Q 20/40* (2012.01)

(56) References Cited

U.S. PATENT DOCUMENTS

| | | | |
|---|---|---|---|
| 2004/0128223 A1 | 7/2004 | Kuhn et al. | |
| 2005/0010613 A1* | 1/2005 | Lejdstrom | G06Q 40/00 |
| 2005/0080703 A1* | 4/2005 | Chiesa | G06Q 40/04 |
| | | | 705/36 R |
| 2007/0250437 A1* | 10/2007 | Lejdstrom | G06Q 40/04 |
| | | | 705/37 |
| 2007/0288347 A1* | 12/2007 | Lejdstrom | G06Q 40/04 |
| | | | 705/37 |
| 2008/0071664 A1* | 3/2008 | Silverman | G06Q 40/08 |
| | | | 705/37 |
| 2008/0117981 A1* | 5/2008 | Lee | H04N 19/61 |
| | | | 375/240.24 |
| 2009/0157501 A1* | 6/2009 | Martel | G06Q 40/04 |
| | | | 705/14.36 |
| 2010/0057608 A1* | 3/2010 | McPherson | G06Q 40/04 |
| | | | 705/37 |
| 2010/0280936 A1* | 11/2010 | Trickey | G06Q 20/02 |
| | | | 705/37 |
| 2012/0078772 A1* | 3/2012 | Booth | G06Q 40/04 |
| | | | 705/37 |
| 2013/0311358 A1* | 11/2013 | Sethi | G06Q 20/29 |
| | | | 705/39 |
| 2015/0058258 A1* | 2/2015 | Glinberg | G06Q 40/06 |
| | | | 705/36 R |

FOREIGN PATENT DOCUMENTS

| | | | |
|---|---|---|---|
| JP | 2005-242719 | 9/2005 | |
| JP | 2006-285711 | 10/2006 | |
| JP | 2007-4799 * | 2/2007 | ............ G06Q 20/00 |
| JP | 2007-47999 | 2/2007 | |
| JP | 2009-31950 | 2/2009 | |
| JP | 2010-503920 | 2/2010 | |
| JP | 2012-203638 | 10/2012 | |
| RU | 2109335 C1 * | 4/1998 | |
| WO | WO-0247314 A2 * | 6/2002 | ............ G06Q 40/04 |
| WO | WO-2007113315 A2 * | 10/2007 | ............ G06Q 40/04 |

OTHER PUBLICATIONS

Anonymous, Continuous Net Settlement (CNS) System, www.dtcc.com/clearing-services, 2017 (Year: 2017).*
Masashi Nakajimi et al., "Kessai System no Subete" $2^{nd}$ Edition, ToyoKeizai Inc., Mar. 10, 2005. (15 pages).
International Search Report dated Feb. 7, 2017 in corresponding International Patent Application No. PCT/JP2017/000673 (3 pages).
International Preliminary Report on Patentability dated Jun. 26, 2017 in International Patent Application No. PCT/JP2015/069548.
International Search Report dated Aug. 25, 2015 in International Patent Application No. PCT/JP2015/069548.
Written Opinion of the International Searching Authority dated Aug. 25, 2015 in International Patent Application No. PCT/JP2015/069548.
International Preliminary Report on Patentability dated Jul. 16, 2019 in corresponding International Patent Application No. PCT/JP2017/000673.
Japanese Office Action dated May 19, 2020 from Japanese Application No. 2018-561141, 5 pages.

* cited by examiner

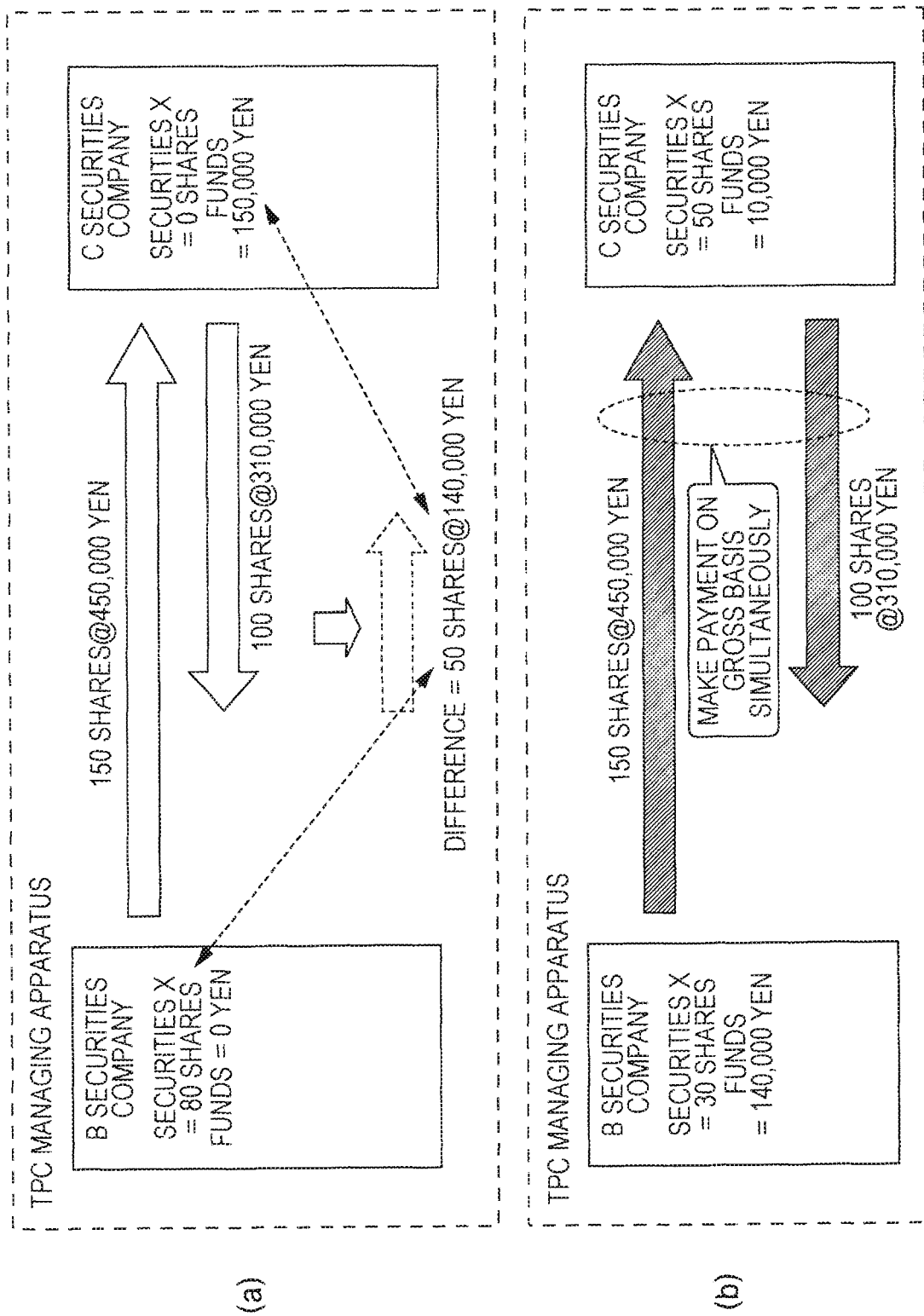

FIG. 4

| | TRADITIONAL OFFSET | TPC MANAGING APPARATUS |
|---|---|---|
| PAYMENT INSTRUCTION DIVISION | NECESSARY (DIVIDED INTO DIFFERENCE AND OFFSET) | NOT NECESSARY |
| INVOICE PAYMENT | NECESSARY (OFFSET IS PAID BY INVOICE) | NOT NECESSARY |
| PAYMENT TIMING | OFFSET IS PAID SIMULTANEOUSLY, AND DIFFERENCE IS PAID BY JASDEC AFTER INSTRUCTION TRANSMISSION | PAY FOR ALL INSTRUCTIONS SIMULTANEOUSLY |
| PARTIAL SETTLEMENT (Partial settle) | IT MIGHT OCCUR | NOT OCCUR SINCE ALL QUANTITIES ARE PAID SIMULTANEOUSLY |
| FUND CHECK | NOT PERFORM | PERFORM |
| DESCRIPTION TO TRANSFER ACCOUNT BOOK | BOOKING ONLY PART CORRESPONDING TO DIFFERENCE INSTRUCTION | BOOKING ACCORDING TO ORIGINAL INSTRUCTION (ON GROSS BASIS) |

FIG. 7

| TRANSACTION ID | FIRST ENTITY | SECOND ENTITY | FIRST ASSET | FIRST TRANSFER QUANTITY | SECOND ASSET | SECOND TRANSFER QUANTITY |
|---|---|---|---|---|---|---|
| 1001 | B SECURITIES COMPANY | C SECURITIES COMPANY | SECURITIES X | 150 SHARES | MONEY | 450,000 YEN |
| 1002 | C SECURITIES COMPANY | B SECURITIES COMPANY | SECURITIES X | 100 SHARES | MONEY | 310,000 YEN |

FINANCIAL TRANSACTION MANAGEMENT SYSTEM AND FINANCIAL TRANSACTION MANAGEMENT METHOD

TECHNICAL FIELD

The present invention relates to a data processing technology, and particularly to a financial transaction management system, a financial transaction management method, and a computer program.

BACKGROUND ART

The applicant of the present application has proposed a securities payment balance management system cooperating with a system of a Japan Securities Depository Center (see, for example, Patent Literature 1). The securities payment balance management system manages a securities balance and a balance of the fund at each stage of payment so that there is no conflict problem in updating data.

CITATION LIST

Patent Literature

Patent Literature 1: JP 2007-47999 A

SUMMARY OF INVENTION

Technical Problem

Currently, third-party clearing which is a business in which a third party makes a clearing payment for a transaction contracted by an exchange member and a transaction participant (a securities company or the like) is in widespread use. It is a main object of the present invention to provide a technique capable of realizing a suitable payment in the third party clearing or the like.

Solution to Problem

In order to solve the above problems, a financial transaction management system according to an aspect of the present invention includes a possessed quantity storage unit that stores information indicating a possessed quantity of an asset in a first entity and information indicating a possessed quantity of an asset in a second entity, a transaction information storage unit that stores first transaction information and second transaction information indicating a transaction of an asset between the first entity and the second entity, a determining unit that determines whether or not a net base transaction based on the first transaction information and the second transaction information is possible by the possessed quantity of an asset in at least one of the first entity and the second entity, and a payment unit that pays for a transaction indicated by the first transaction information on a gross basis and pays for a transaction indicated by the second transaction information on a gross basis when the determining unit determines that the net base transaction is possible.

Another aspect of the present invention is also a financial transaction management system. The financial transaction management system includes a possessed quantity storage unit that stores information indicating a possessed quantity of an asset in a first entity, information indicating a possessed quantity of an asset in a second entity, and information indicating a possessed quantity of an asset in a third entity, a transaction information storage unit that stores first transaction information indicating a transaction of an asset between the first entity and the second entity, second transaction information indicating a transaction of an asset between the second entity and the third entity, and third transaction information indicating a transaction of an asset between the third entity and the first entity, a determining unit that determines whether or not a net base transaction based on the first transaction information, the second transaction information, and the third transaction information is possible by the possessed quantity of an asset in at least one of the first entity, the second entity, and the third entity, and a payment unit that pays for each of a transaction indicated by the first transaction information, a transaction indicated by the second transaction information, and a transaction indicated by the third transaction information on a gross basis when the determining unit determines that the net base transaction is possible.

Still another aspect of the present invention is a financial transaction management method. The method is executed by a computer which is able to access a possessed quantity storage unit that stores information indicating a possessed quantity of an asset in a first entity and information indicating a possessed quantity of an asset in a second entity and a transaction information storage unit that stores first transaction information and second transaction information indicating a transaction of an asset between the first entity and the second entity, and includes a step of determining whether or not a net base transaction based on the first transaction information and the second transaction information is possible by the possessed quantity of an asset in at least one of the first entity and the second entity and a step of paying for a transaction indicated by the first transaction information on a gross basis and paying for a transaction indicated by the second transaction information on a gross basis when it is determined that the net base transaction is possible.

An arbitrary combination of the above components and a description of the present invention may be converted among an apparatus, a computer program, a recording medium having a computer program stored therein, and such conversion is also effective as an aspect of the present invention.

Advantageous Effects of Invention

According to the present invention, a suitable payment can be realized in the third party clearing or the like.

BRIEF DESCRIPTION OF DRAWINGS

FIG. 3 is a diagram schematically illustrating a payment by a TPC managing apparatus according to an embodiment.

FIG. 4 is a comparison table of a traditional offset and a payment by a TPC managing apparatus according to an embodiment.

FIG. 7 is a diagram illustrating a configuration example of transaction information.

DESCRIPTION OF EMBODIMENT

An overview will be described before describing a detailed configuration of an embodiment.

Figure 1:
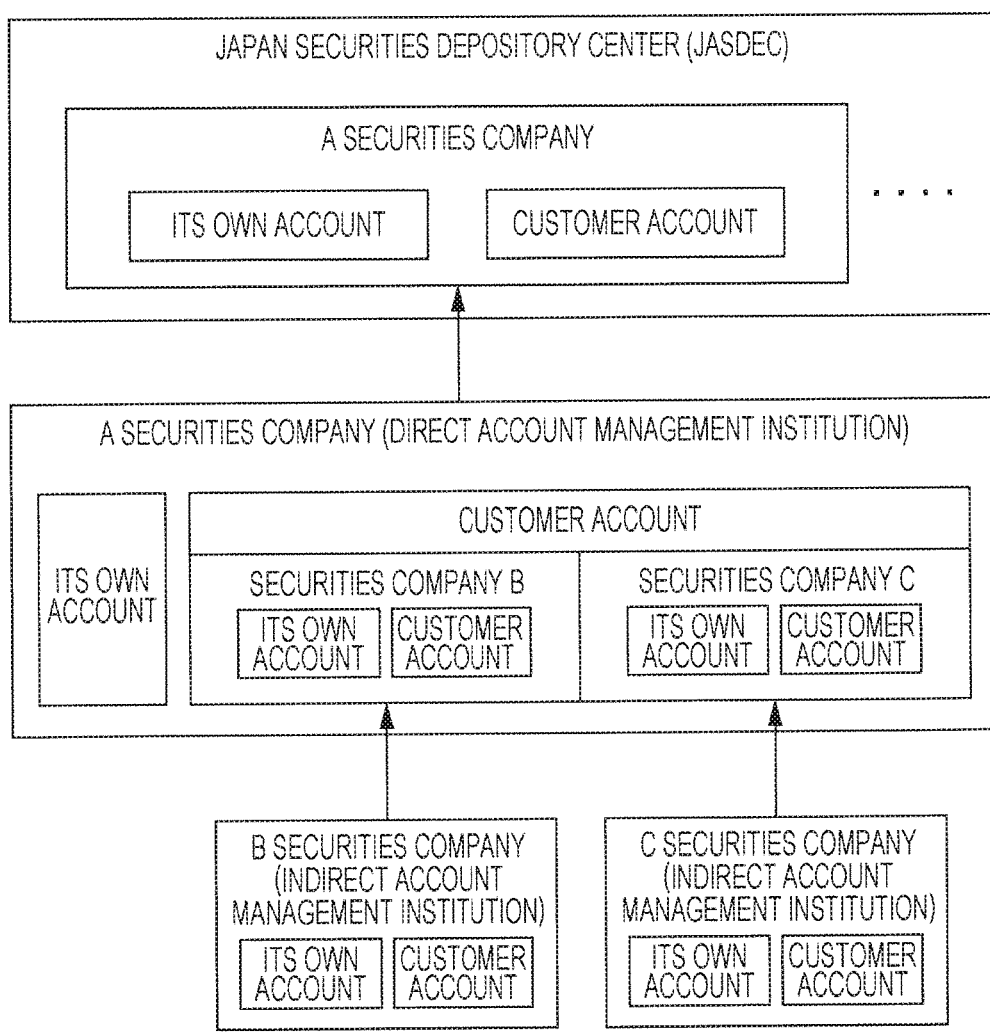
FIG. 1 is a diagram schematically illustrating a form of account management.

FIG. 1 schematically illustrates the form of account management. Currently, a form of account management has a multi-layer structure. An A securities company in FIG. 1 is a direct account management institution that has an account in a Japan securities depository center (hereinafter also referred to as "JASDEC") and is system-connected with the JASDEC. A B securities company and a C securities company in FIG. 1 are indirect account management institutions that have an account in the A securities company and are system-connected with the A securities company. The direct account management institution and the indirect account management institution may be financial institutions other than the securities companies and, for example, may be banks.

In an embodiment, an information processing system (a financial transaction management system described later) that supports third party clearing (hereinafter also referred to as "TPC") in the direct account management institution (the A securities company in FIG. 1). The TPC is a business in which a third party (for example, the A securities company in FIG. 1) makes a clearing payment for a transaction contracted by an exchange member and a transaction participant (for example, the B securities company or the C securities company in FIG. 1).

Figure 2:
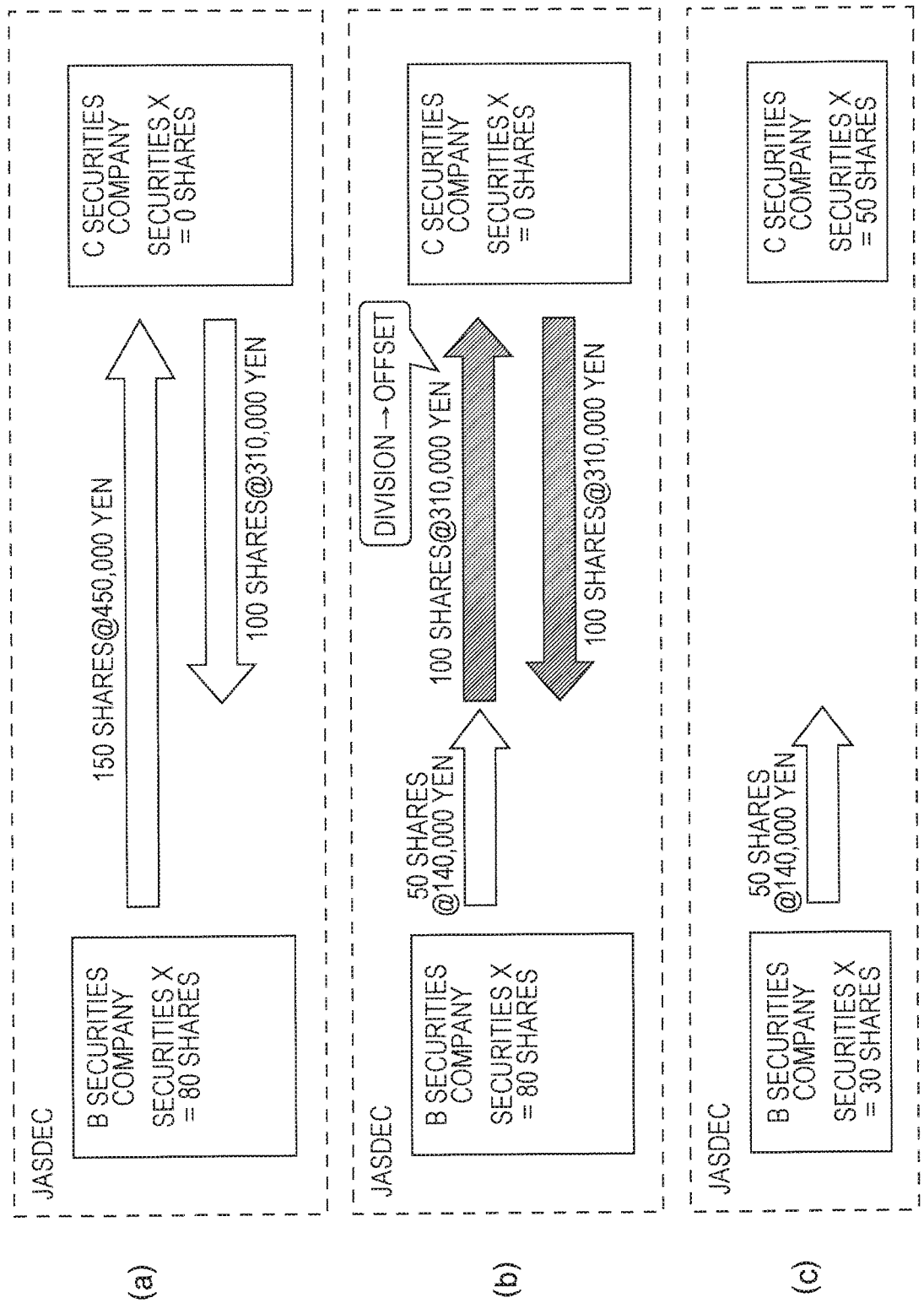
FIG. 2 is a diagram schematically illustrating a traditional offset.

FIGS. 2(a), 2(b), and 2(c) schematically illustrate a traditional offset (also referred to as an offset process). In FIG. 2 (similarly in FIG. 3), a direction of an arrow indicates a transfer direction of securities, and a transfer direction of money is a direction opposite to the arrow. As illustrated in FIG. 2(a), a first transaction (also referred to as an instruction) is a transaction in which 150 shares of securities X are transferred from the B securities company to the C securities company, and money of 450,000 yen is paid from the C securities company to the B securities company as a value thereof. A second transaction is a transaction in which 100 shares of the securities X are transferred from the C securities company to the B securities company, and money of 310,000 yen is paid from the C securities company to the B securities company as a value thereof.

As illustrated in FIG. 2(b), in the traditional offset, the first transaction is divided into an offset and a difference, and the offset of the first transaction is offset by the second transaction. As illustrated in FIG. 2(c), a transaction of the remaining difference is paid, and 50 shares of the securities X are transferred from the B securities company to the C securities company. Further, the money of the difference (here, 140,000 yen) may be reflected in assets (a margin value) secured in the JASDEC by the securities company C.

FIGS. 3(a) and 3(b) schematically illustrate payment by a TPC managing apparatus according to an embodiment. The same two transactions as in FIG. 2 are clearing targets in FIG. 3. As illustrated in FIG. 3(a), the TPC managing apparatus derives the difference between the first transaction and the second transaction (a dotted arrow in FIG. 3(a) which is also called a netting balance or a net balance), and checks whether or not it is possible to perform a transaction of the difference on the basis of the balance of the B securities company and the balance of the C securities company.

As illustrated in FIG. 3(b), the TPC managing apparatus simultaneously pays for a plurality of transactions which are clearing targets on a gross basis. In other words, the TPC managing apparatus simultaneously executes a face value clearing process for each of the first transaction and the second transaction. As a result of clearing the two transactions in FIG. 3(b), 50 shares of the securities X are transferred from the B securities company to the C securities company, and money of 140,000 yen is transferred from the C securities company to the B securities company.

FIG. 4 is a comparison table of the traditional offset (FIG. 2) and the payment by the TPC managing apparatus according to the embodiment (FIG. 3). The traditional offset requires a payment instruction division and an invoice payment. Further, since the offset and the difference are paid separately, partial settlement may occur (for example, payment for the offset may be completed, but payment for the difference may not be completed). Further, since only a difference instruction is booked to a transfer account book, it may be difficult to identify an original instruction if the payment of the difference instructions fails in the JASDEC.

On the other hand, in the payment by the TPC managing apparatus according to the embodiment, the payment instruction division, the invoice payment, and the JASDEC instruction transmission are not necessary. Further, the partial settlement does not occur because the payments are simultaneously made on a plurality of instructions on a gross basis under the condition that a possessed quantity of securities/funds of a transactions entity does not run short. Further, since a value of an original instruction (on a gross basis) is booked to the transfer account book, it is also easy to confirm the original instruction when the payment fails or the like.

A detailed configuration of the embodiment will be described.

Figure 5:
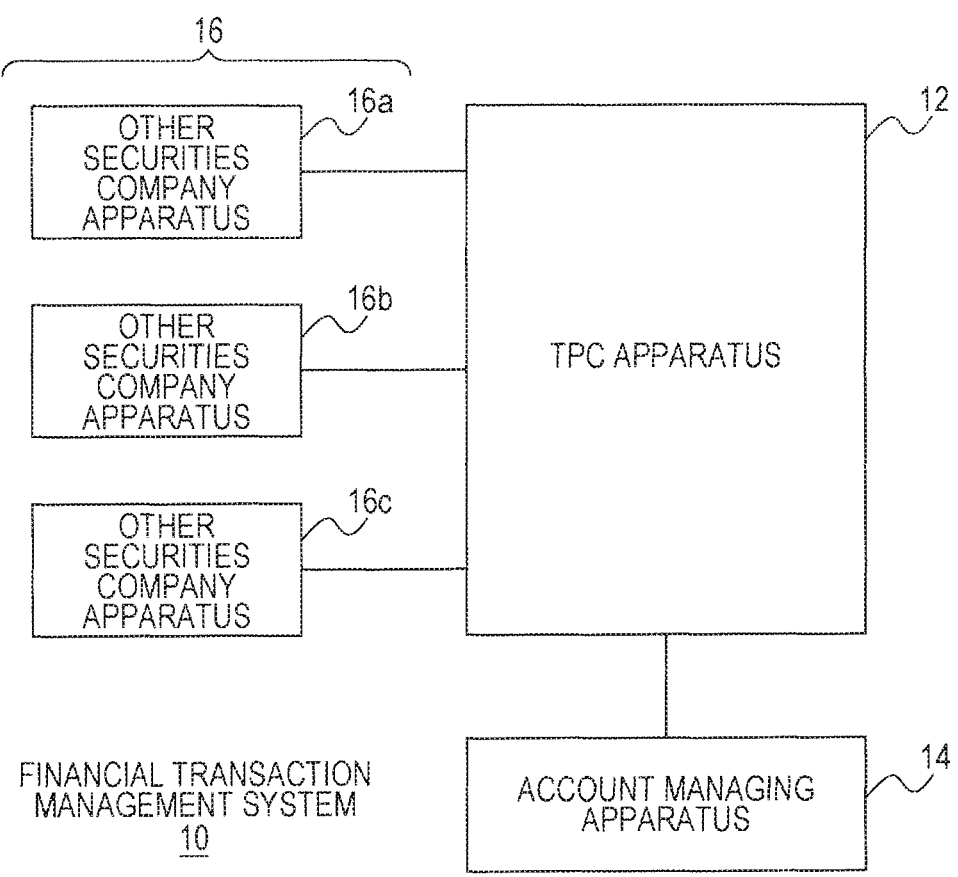
FIG. 5 is a diagram illustrating a configuration of a financial transaction management system according to an embodiment.

FIG. 5 illustrates a configuration of a financial transaction management system 10 according to an embodiment. The financial transaction management system 10 includes a TPC apparatus 12, an account managing apparatus 14, and an other securities company apparatus 16a, an other securities company apparatus 16b, and an other securities company apparatus 16c which are referred to collectively as an "other securities company apparatus 16." These apparatuses are connected via a communication network including a LAN, a WAN, the Internet, or the like.

The TPC apparatus 12 and the account managing apparatus 14 are information processing apparatuses installed in the securities company A (the direct account management institution) in FIG. 1. The account managing apparatus 14 includes a storage unit that stores information indicating the possessed quantity of assets in a first entity and information indicating the possessed quantity of assets in a second entity. The account managing apparatus 14 according to the embodiment stores information of accounts opened by participants (which are indirect account management institutions such as the securities company B and the securities company C) in the TPC provided by the securities company A. The account managing apparatus 14 stores account information indicating possessed quantities of a plurality of types of assets which are transaction targets. The plurality of types of assets include various financial products and cash vouchers, and include, for example, valuable securities (securities, bonds, and the like) and currencies. The account information according to the embodiment includes at least a securities balance (data indicating a type, an issue, a quantity, and the like of the possessed securities) and a balance of the fund of the TPC participants. As a modified example, the TPC apparatus 12 and the account managing apparatus 14 may be realized as one apparatus, and for example, the TPC apparatus 12 may be configured to include a storage unit of the account managing apparatus 14.

The other securities company apparatus 16 is an information processing apparatus operated by the TPC participants (for example, employees of the securities company B and the securities company C) and registers transaction information indicating transactions of assets in the TPC apparatus 12. The TPC apparatus 12 executes a TPC process (in other words, a payment process) for a plurality of pieces of transaction information registered from the other securities company apparatus 16. The TPC apparatus 12 can be regarded as a financial transaction management apparatus and can be regarded as a payment management apparatus.

Figure 6:
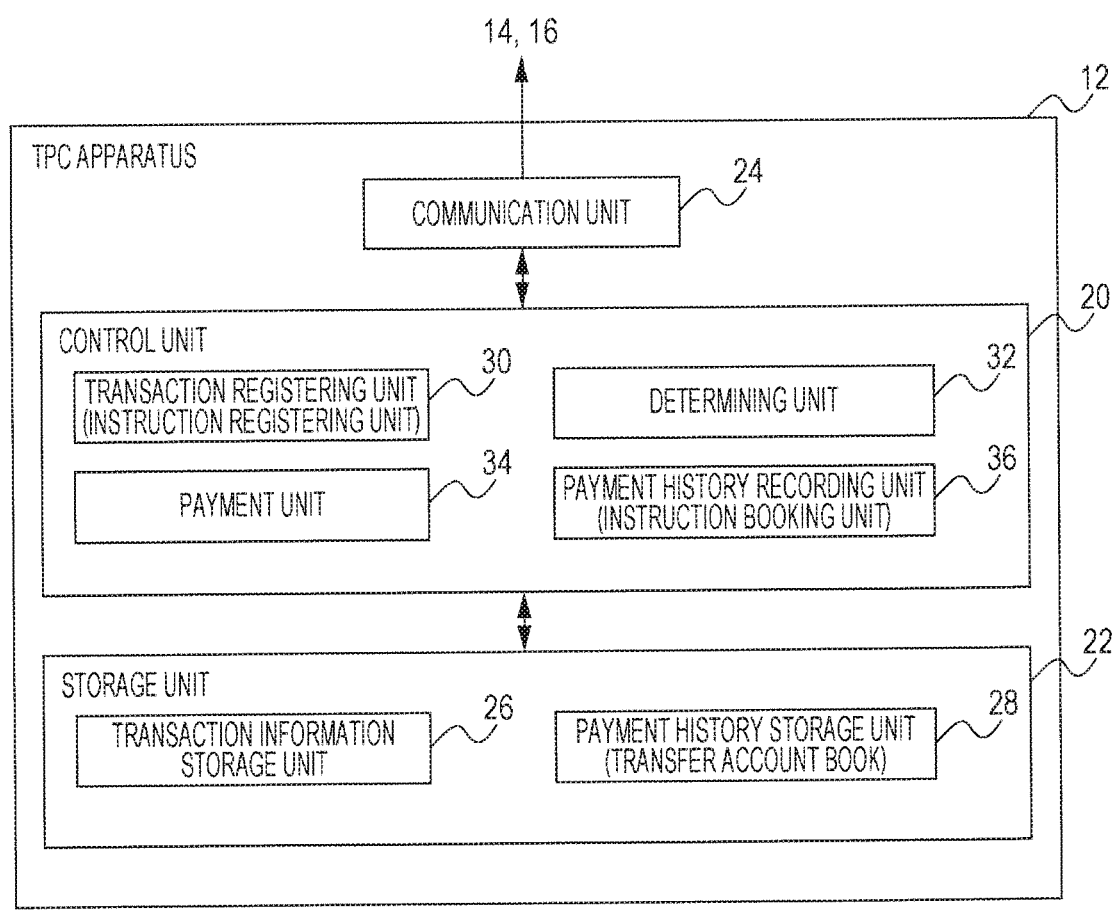
FIG. 6 is a block diagram illustrating a functional configuration of a TPC apparatus of FIG. 5.

FIG. 6 is a block diagram illustrating a functional configuration of the TPC apparatus 12 of FIG. 5. The TPC apparatus 12 includes a control unit 20, a storage unit 22, and a communication unit 24. The control unit 20 executes various data processing related to TPC processing. The storage unit 22 is a storage area for storing data to be referred to or updated by the control unit 20. The communication unit 24 communicates with an external apparatus in accordance with a predetermined communication protocol. The control unit 20 exchanges data with the account managing apparatus 14 and the other securities company apparatus 16 via the communication unit 24.

Each of the blocks illustrated in the block diagram of the present specification can be realized by hardware such as an element such as a CPU of a computer or a mechanical apparatus or can be realized by software such as a computer program, but functional blocks realized by a combination thereof are illustrated here. Therefore, it is understood by those skilled in the art that these functional blocks can be realized in various forms by a combination of hardware and software.

For example, a computer program including modules corresponding to the blocks in the control unit 20 may be stored in a recording medium such as a DVD and installed on the TPC apparatus 12. Then, the functions of the blocks may be performed as a processor (a CPU or the like) of the TPC apparatus 12 reads the computer program stored in a storage out to a main memory and executes it. The storage unit 22 may be realized by a storage or a memory of the TPC apparatus 12 storing data.

The storage unit 22 includes a transaction information storage unit 26 and a payment history storage unit 28. The transaction information storage unit 26 stores a plurality of pieces of transaction information registered from the other securities company apparatus 16. The payment history storage unit 28 stores information related to the transactions paid by a payment unit 34 to be described later. For example, among a plurality of pieces of transactions information registered from the other securities company apparatus 16, transaction information in which a payment is not completed is stored in the transaction information storage unit 26, and transaction information in which a payment is completed is stored in the payment history storage unit 28. The payment history storage unit 28 may be implemented as a transfer account book. The TPC apparatus 12 may include a transfer account storage unit that stores a transfer account book separately from the payment history storage unit 28. The transfer account storage unit may record information of transactions for which a payment is completed by a transaction performed by the other securities company itself among the transactions registered from the other securities company apparatus 16 in the transfer account book.

FIG. 7 illustrates an example of a configuration of transaction information. A transaction according to an embodiment is a financial transaction, and the first and second entities are counterparts of the financial transaction. Each of the first entity and the second entity means an entity that interacts with the other party in the financial transaction, and includes, for example, an individual, a company (typically, a financial institution such as a securities company), an account, and an exchange. A first asset includes information indicating a type of an asset transferred from the first entity to the second entity (for example, a type of financial product, an issue of securities, or the like), and a first transfer quantity is information indicating a transfer quantity of the first asset. A second asset includes information indicating a type of an asset transferred from the second entity to the first entity, and a second transfer quantity is information indicating a transfer quantity of the second asset. The second asset may be a value for the transfer of the first asset.

The two pieces of transaction information illustrated in FIG. 7 correspond to the two pieces of transaction information illustrated in FIG. 3(*a*). The transaction information can also be regarded as information indicating authorities and obligations based on a sales contract (in other words, a transfer contract) between transaction entities. The transaction information stored in the transaction information storage unit 26 and the payment history storage unit 28 may have the configuration illustrated in FIG. 7. Here, the configuration of FIG. 7 is an example, and the transaction information only needs to substantially include the information item illustrated in FIG. 7.

Returning to FIG. 6, the control unit 20 includes a transaction registering unit 30, a determining unit 32, a payment unit 34, and a payment history recording unit 36. The transaction registering unit 30 stores data of the transaction information sent from the other securities company apparatus 16 in the transaction information storage unit 26. The transaction information can also be regarded as an instruction to transfer an asset, and the transaction registering unit 30 can also be regarded as an instruction registering unit.

The determining unit 32 reads a plurality of pieces of transaction information which are stored in the transaction information storage unit 26 and has the first entity (for example, the B securities company) and the second entity (for example, the C securities company) as the transaction entities. Although not illustrated in FIG. 7, a payment day may be set in each piece of transaction information, and the determining unit 32 may read out a plurality of pieces of transaction information in which a current day is set as the payment day as a payment target. The determining unit 32 derives a net base transaction (a quantity of transaction) based on the plurality of pieces of read transaction information. The net base transaction can be regarded as the difference between first transaction information and second transaction information and can also be regarded as a difference remaining as a result of offsetting a plurality of pieces of transaction information. The determining unit 32 derives a quantity of net base transaction for each of a plurality of types of assets which are transaction targets in the transaction information.

The determining unit 32 determines whether or not a specified net base transaction is possible by a possessed quantity of an asset in at least one of the first entity and the second entity. Specifically, the determining unit 32 determines whether or not the net base transaction quantity for each of a plurality of types of assets which are transaction targets is possible by a possessed quantity of each asset in at least one of the first entity and the second entity. For example, when the net base transfer quantity for securities of a certain issue is less than or equal to a quantity of securities possessed by a transfer source entity on a net basis (that is, a balance of the securities in an account of a transfer source), the determining unit 32 determines that the net base transaction is possible for the securities of the issue.

The determining unit 32 may derive a net base transaction quantity for each transaction entity decided by at least one piece of transaction information when a plurality of pieces of transaction information which are determination targets (payment targets) are read. Specifically, the determining unit 32 may derive an increase or decrease quantity of an asset by aggregating input and output of a plurality of pieces of transaction information for each transaction entity and for each type of asset. The determining unit 32 may determine that the net base transaction based on a plurality of pieces of transaction information is possible when a possessed quantity of assets is equal to or larger than a decrease quantity of an asset for all combinations of transaction entities and types of asset.

For example, in the example of FIG. 3, for the B securities company, the determining unit 32 may derive that the securities X is reduced by 50 shares (that is, 100 shares—150 shares), and the fund is increased by 140,000 yen (that is, 450,000 yen to 310,000 yen) on the basis of the first transaction and the second transaction. Further, for the C securities company, it may be derived that the securities X is increased by 50 shares (that is, 150 shares—100 shares) and the fund is decreased by 140,000 yen (that is, 310,000 yen—450,000 yen). Also, it may be determined that the net base transaction is possible because the possessed quantity of the securities X in the B securities company is 80 shares (≥50 shares), and the possessed quantity of the fund in the C securities company is 150,000 yen (≥140,000 yen).

The payment unit 34 makes a payment, on a gross basis, for each of a plurality of transactions indicated by a plurality of pieces of transaction information (that is, the transfer of the asset) when it is determined that the net base transaction is possible for any of a plurality of types of assets which are transaction targets. For example, the payment unit 34 updates account information of an asset transfer source entity and account information of an asset transfer destination entity stored in the account managing apparatus 14 so that transaction content (a transfer quantity of asset) indicated by first transaction information is reflected. At the same time, the payment unit 34 updates the account information of the asset transfer source entity and the account information of the asset transfer destination entity stored in the account managing apparatus 14 so that transaction content indicated by second transaction information is reflected. Of course, a necessary process can be further executed in addition to the updating of the account information.

Also, the payment unit 34 pays for a plurality of transactions indicated by a plurality of pieces of transaction information substantially simultaneously. "Substantially simultaneously" means that a short-time deviation in a payment timing is allowed. For example, the payment unit 34 may execute the payment processes for a plurality of pieces of transaction information to be paid simultaneously in parallel or may execute them sequentially in a short time.

Also, the payment unit 34 may execute the payment process for each of a plurality of pieces of transaction information as one transaction process.

Further, the payment unit 34 may proceed with the payment process on a gross basis regardless of whether or not the balance of the account of the transaction entity temporarily becomes negative during a payment of a plurality of transactions. In other words, in a case in which the payment unit 34 pays for transactions of some pieces of transaction information among a plurality of pieces of transaction information, the payment unit 34 may allow that the balance of the assets (the securities, the fund, or the like) indicated by the account information of the first entity or the second entity temporarily becomes a negative value. Further, since it is confirmed that the net base transaction is possible by the determining unit 32, if a transaction indicated by the other transaction information is paid, the balance of the asset in the account information of each transaction entity finally becomes a positive value. In a case in which the balance of at least one transaction entity becomes negative after simultaneous payment for a plurality of transactions, a predetermined error process may be performed.

The payment history recording unit 36 stores the transaction information in which the payment is completed by the payment unit 34 in the payment history storage unit 28. Since the payment unit 34 pays for the transaction indicated by transaction information on a gross basis as described above, the payment history recording unit 36 registers the transaction content indicated by each of a plurality of pieces of transaction information in the payment history storage unit 28 on a gross basis rather than a difference basis.

An operation of the TPC apparatus 12 with the above configuration will be described.

The other securities company apparatuses 16 of a plurality of securities companies which are TPC participants transmit the transaction information to be paid to the TPC apparatus 12 in accordance with an operation by a person in charge. The transaction registering unit 30 of the TPC apparatus 12 stores a plurality of pieces of transaction information transmitted from the other securities company apparatuses 16 of a plurality of TPC participants in the transaction information storage unit 26.

If it becomes a predetermined payment timing, the determining unit 32 of the TPC apparatus 12 reads a plurality of pieces of transaction information to be cleared at the same timing from the transaction information storage unit 26. The determining unit 32 determines whether or not the net base transactions based on a plurality of pieces of transaction information is possible by the possessed quantity of assets indicated by the account information of each TPC participant. In a case in which the determining unit 32 determines that the net base transaction based on a plurality of pieces of transaction information is possible, the payment unit 34 simultaneously pays for the plurality of pieces of transaction information. The payment history recording unit 36 stores the plurality of pieces of transaction information paid by the payment unit 34 in the payment history storage unit 28.

The payment by the TPC apparatus 12 according to the embodiment is not subject to the limitations of the JASDEC because it is transfer of the asset within the customer account of the direct account management institution illustrated in FIG. 1. Therefore, according to the TPC apparatus 12 according to the embodiment, a suitable payment in the third party clearing can be realized. For example, as partly described above with reference to FIG. 4, the TPC apparatus 12 simultaneously pays for a plurality of pieces of transaction information on a gross basis, and the partial settlement of payment does not occur. Further, since the transaction content indicated by the original transaction information is recorded, it is possible to secure traceability at the time of error occurrence or the like. Further, since the TPC apparatus 12 does not divide the original payment instruction, it is easily possible to give a notification indicating that the payment is completed by the original transaction content to the other securities company apparatus 16 or an overseas base or customer of the other securities company existing in front thereof.

Also, the TPC apparatus 12 according to the embodiment enables wider clearing (offset) than the traditional offset. For example, an offset target by the TPC apparatus 12 includes (1) a transaction (loop) over three or more companies, (2) a transaction (loop) over three or more company accounts, and (3) a transaction (loop) including an exchange.

(1) Loop over three or more companies:

First, a case in which a transaction loops over three accounts of three companies is considered. The transaction entities (the B securities company, the C securities company, a D securities company in FIG. 8) are all TPC participants. It is also under the assumption that a multi-lateral offset (also referred to as multi-lateral netting) is possible. In the traditional offset, an offset payment is unable to be made for a loop of a transaction associated with three or more companies.

Figure 8:
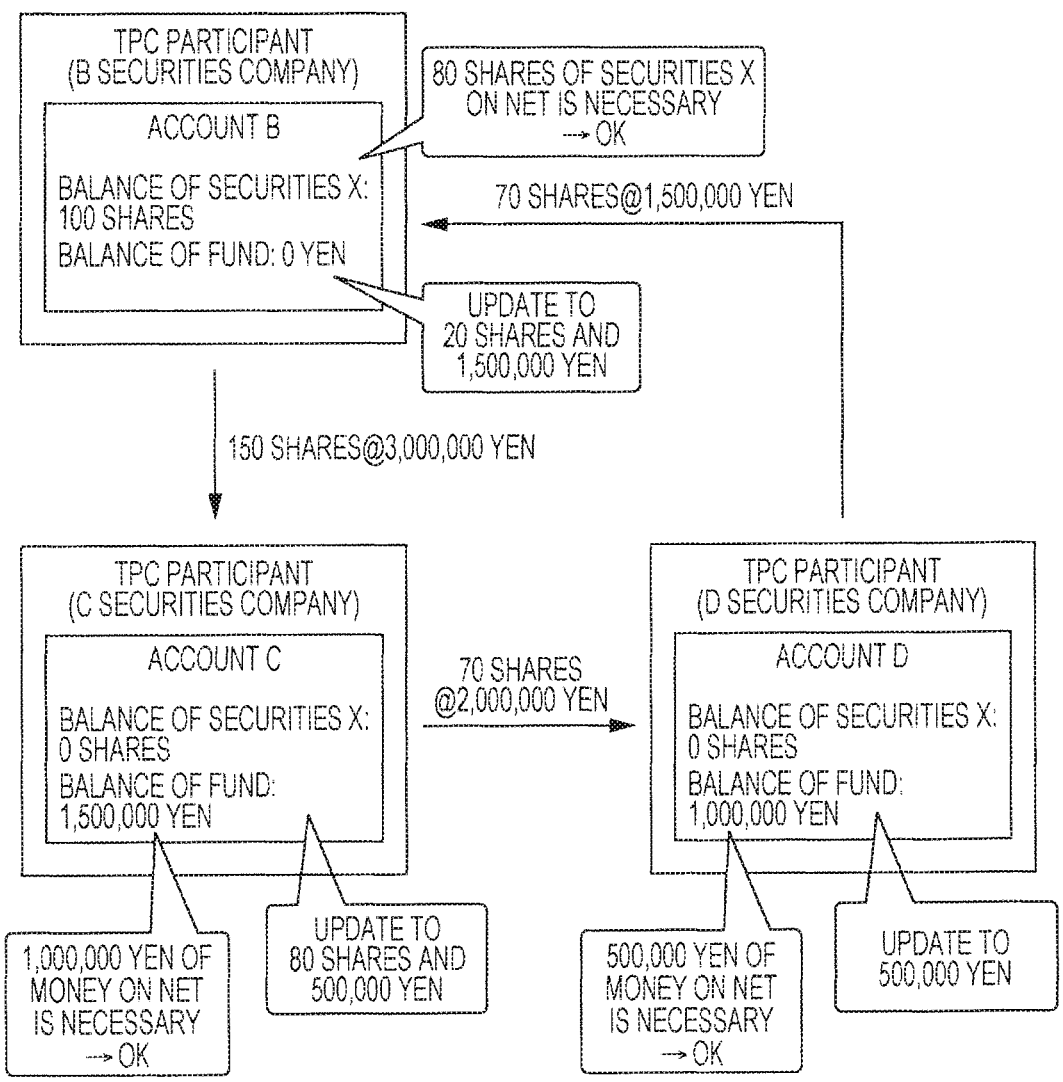
FIG. 8 is a diagram schematically illustrating a loop of transaction over three or more companies.

FIG. 8 schematically illustrates a loop of a transaction over three or more companies. Data of an account B, an account C, and an account D in FIG. 8 are held in the account managing apparatus 14. Here, three pieces of transaction information are payment targets. First transaction information indicates that 150 shares of the securities X are transferred from the B securities company to the C securities company, and 3 million yen is transferred from the C securities company to the B securities company as a value thereof. A direction of an arrow is a transfer direction of the securities X, and a direction opposite to the arrow is a transfer direction of fund. Second transaction information indicates that 70 shares of the securities X are transferred from the C securities company to the D securities company, and the value is 2 million yen. Third transaction information indicates that 70 shares of the securities X are transferred from the D securities company to the B securities company, and the value is 1.5 million yen.

In the example of FIG. 8, since the securities X are reduced from the account B by 80 shares on a net basis, but since the balance of the securities X of the account B is 100 shares, the determining unit 32 of the TPC apparatus 12 determines that the net base transaction is possible. Further, although the fund is reduced from the account C by 1 million yen on a net basis, since the balance of the fund of the account C is 1.5 million yen, the determining unit 32 determines that the net base transaction is possible. Further, although the fund is reduced from the account D by 500,000 yen on a net basis, since the balance of the fund of the account D is 1 million yen, the determining unit 32 determines that the net base transaction is possible.

The payment unit 34 of the TPC apparatus 12 simultaneously pays for the three transactions indicated by the three pieces of transaction information. As a result, the balance of the securities X of the account B is updated to 20 shares, and the balance of the fund is updated to 1.5 million yen. Further, the balance of the securities X of the account C is updated to 80 shares and the balance of the fund is updated to 500,000 yen. Further, the balance of the fund of the account D is updated to 500,000 yen. Thus, the TPC apparatus 12 can realize the payment for the transaction looping over three or more companies.

(2) Loop over three or more company accounts:

Next, a case in which a transaction loops over three accounts in one securities company is considered. In the traditional offset, the offset payment is unable to be made for the loop of the transaction associated with three or more accounts.

Figure 9:
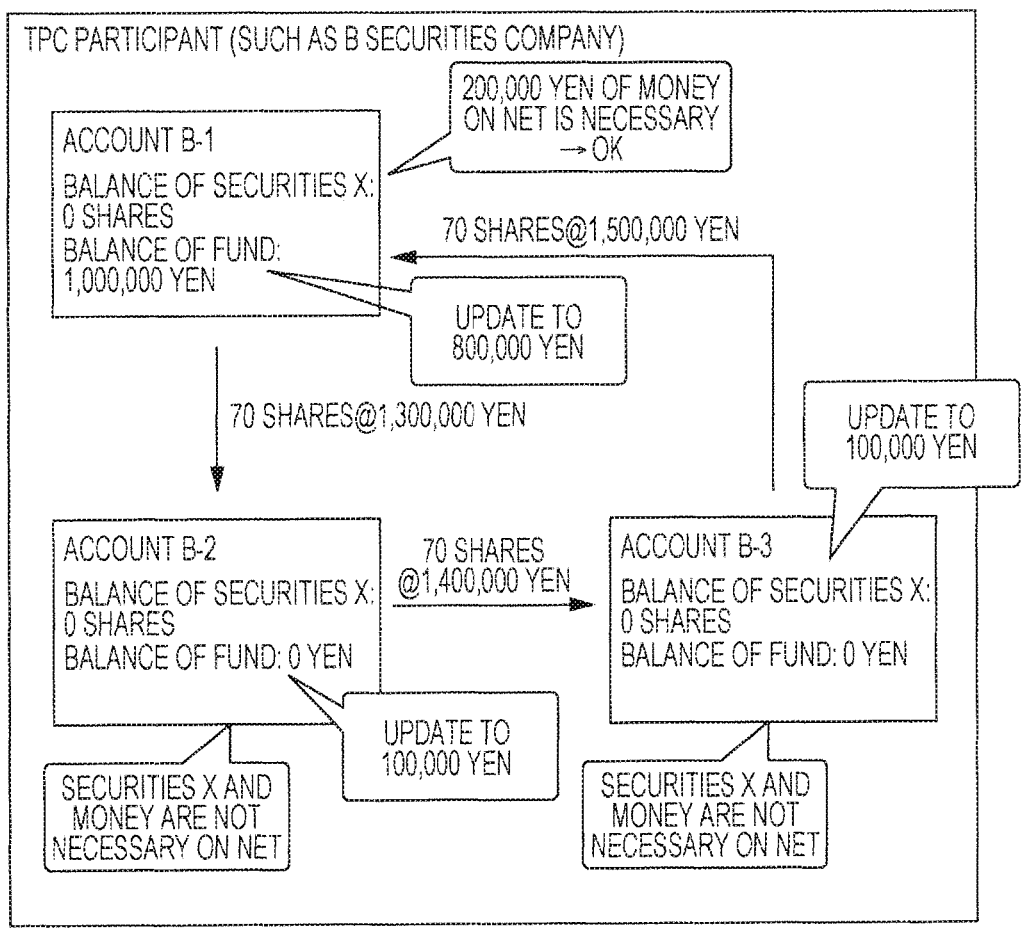
FIG. 9 is a diagram schematically illustrating a loop of transaction over three or more accounts.

FIG. 9 schematically illustrates a loop of a transaction over three or more accounts. Data of an account B-1, an account B-2, and an account B-3 in FIG. 9 are held in the account managing apparatus 14. Here, three pieces of transaction information are payment targets. First transaction information indicates that 70 shares of the securities X are transferred from the account B-1 to the account B-2, and a value thereof is 1.3 million yen. Second transaction information indicates that 70 shares of the securities X are transferred from the account B-2 to the account B-3, and a value thereof is 1.4 million yen. Third transaction information indicates that 70 shares of the securities X are transferred from the account B-3 to the account B-1, and a value thereof is 1.5 million yen.

In the example of FIG. 9, the fund is reduced from the account B-1 by 200,000 yen on a net basis, but since the balance of the fund of the account B-1 is 1 million yen, the determining unit 32 of the TPC apparatus 12 determines that the net base transaction is possible. Also, for the account B-2 and the account B-3, the determining unit 32 determines that the balances of the securities X and the fund are not necessary since the security X and the fund do not decrease on a net basis, and determines that the net base transaction is possible.

The payment unit 34 of the TPC apparatus 12 simultaneously pays for the three transactions indicated by the three pieces of transaction information on a gross basis. As a result, the balance of the fund of the account B-1 is updated to 800,000 yen. Further, the balance of the fund of the account B-2 is updated to 100,000 yen. Further, the balance of the fund of the account B-3 is updated to 100,000 yen. Thus, the TPC apparatus 12 can realize the payment for the transaction looping over three or more accounts of one TPC participant.

(3) Loop including exchange:

Next, a case in which a transaction loops over an exchange is considered. The transaction entities (the B securities company and the C securities company in FIG. 10) are TPC participants. Further, as will be described later with reference to FIG. 10, a delivery port of a TPC servicer corresponding to an exchange is installed in the TPC apparatus 12. Further, it is also under the assumption that a multi-lateral offset is possible. In the traditional offset, a payment is unable to be made for a loop of a transaction including an exchange.

Figure 10:
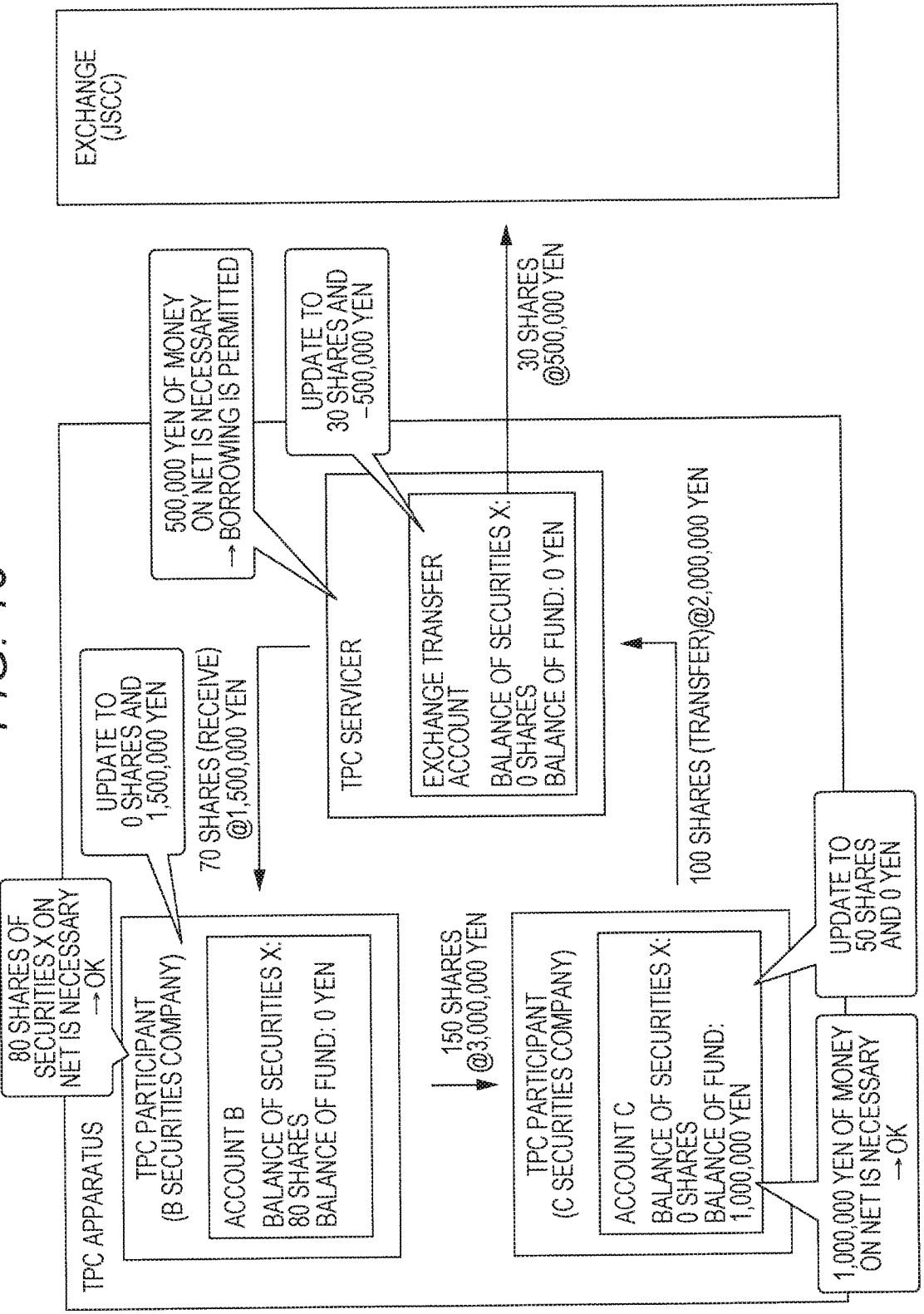
FIG. 10 is a diagram schematically illustrating a loop of transaction including an exchange.

FIG. 10 schematically illustrates a loop of a transaction including an exchange. Data of an account B, an account C, and an exchange delivery port in FIG. 10 are held in the account managing apparatus 14. Here, three pieces of transaction information are payment targets. First transaction information indicates that 150 shares of the securities X are transferred from the B securities company to the C securities company, and a value thereof is 3 million yen. Second transaction information indicates that the securities company C sells 100 shares of the securities X to the exchange for 2 million yen. Third transaction information indicates that the securities company B purchases 70 shares of the securities X from the exchange for 1.5 million yen. Also, the exchange delivery port is an account that serves as an interface for performing buying and selling of the securities with the exchange, and is generated in advance by the TPC apparatus 12. The overdraft is allowed in the exchange delivery port according to the embodiment. The overdraft is allowed because, in the transaction with the exchange, it is guaranteed that the value is paid (for example, 500,000 yen is paid if 30 shares are delivered). The overdraft may be prohibited as a modified example.

In the example of FIG. 10, although the securities X is reduced from the account B by 80 shares on a net basis, since the balance of the securities X of the account B is 80 shares, the determining unit 32 of the TPC apparatus 12 determines that the net base transaction is possible. Further, although the fund is reduced from the account C by 1 million yen on a net basis, since the balance of the fund of the account C is 1 million yen, the determining unit 32 determines that the net base transaction is possible. Moreover, although the balance of the fund of the exchange delivery port is 0 yen while the fund is reduced from the exchange delivery port by 500,000 yen on a net basis, since the overdraft is allowed in the exchange delivery port, the determining unit 32 determines that the net base transaction is possible.

The payment unit 34 of the TPC apparatus 12 simultaneously pays for the three transactions indicated by the three pieces of transaction information on a gross basis. As a result, the balance of the securities X of the account B is updated to 0 shares, and the balance of the fund is updated to 1.5 million yen. Further, the balance of the securities X of the account C is updated to 50 shares, and the balance of the fund is updated to 0 yen. Further, the balance of the securities X of the exchange delivery port is updated to 30 shares, and the balance of the fund is updated to minus 500,000 yen. Further, the TPC apparatus 12 may execute a process of selling 30 shares of the securities X (a process of selling 30 shares for 500,000 yen) to the system of the exchange (JSCC) in asynchronous with the payment process for the three pieces of transaction information. As described above, the TPC apparatus 12 can realize the payment for the loop of the transaction including the exchange.

The present invention has been described on the basis an embodiment. It would be understood by those skilled in the art that the embodiment is an example, various modifications can be made for a combination of components or processing processes, and such modifications are also within the scope of the present invention.

The technology described in the above embodiment (that is, the payment process and the offset process of a plurality of transactions) is applicable to a payment for a financial transaction in various financial institutions in addition to the direct account management institution.

An arbitrary combination of the above embodiment and the modifications is also useful as an embodiment of the present invention. A new embodiment resulting from the combination also has the effects of each of the embodiment and the modifications which are combined. It would also be understood by those skilled in the art that functions to be performed by respective constituent elements set forth in claims can be realized by a single element or a cooperation of the respective constituent elements described in the embodiment and the modifications.

REFERENCE SIGNS LIST

10 financial transaction management system
12 TPC apparatus
14 account managing apparatus
26 transaction information storage unit
28 payment history storage unit
30 transaction registering unit
32 determining unit
34 payment unit

INDUSTRIAL APPLICABILITY

The invention is applicable to apparatuses that manage financial transactions.

FIG. 1
JAPAN SECURITIES DEPOSITORY CENTER (JASDEC)
A SECURITIES COMPANY
ITS OWN ACCOUNT
CUSTOMER ACCOUNT
A SECURITIES COMPANY (DIRECT ACCOUNT MANAGEMENT INSTITUTION)
SECURITIES COMPANY B
SECURITIES COMPANY C
B SECURITIES COMPANY (INDIRECT ACCOUNT MANAGEMENT INSTITUTION)
C SECURITIES COMPANY (INDIRECT ACCOUNT MANAGEMENT INSTITUTION)
FIG. 2(*a*)
JASDEC
B SECURITIES COMPANY
SECURITIES X=80 SHARES
150 SHARES@450,000 YEN
100 SHARES@310,000 YEN
C SECURITIES COMPANY
SECURITIES X=0 SHARES
FIG. 2(*b*)
JASDEC
B SECURITIES COMPANY
SECURITIES X=80 SHARES
50 SHARES@140,000 YEN
100 SHARES@310,000 YEN
DIVISION →OFFSET
C SECURITIES COMPANY
SECURITIES X=0 SHARES
FIG. 2(*c*)
JASDEC
B SECURITIES COMPANY
SECURITIES X=30 SHARES
50 SHARES@140,000 YEN
C SECURITIES COMPANY
SECURITIES X=50 SHARES
FIG. 3(*a*)
TPC MANAGING APPARATUS
B SECURITIES COMPANY
SECURITIES X=80 SHARES
FUNDS=0 YEN
150 SHARES@450,000 YEN
100 SHARES@310,000 YEN
DIFFERENCE=50 SHARES@140,000 YEN
C SECURITIES COMPANY
SECURITIES X=0 SHARES
FUNDS=150,000 YEN
FIG. 3(*b*)
TPC MANAGING APPARATUS
B SECURITIES COMPANY
SECURITIES X=30 SHARES
FUNDS=140,000 YEN
150 SHARES@450,000 YEN
MAKE PAYMENT ON GROSS BASIS SIMULTANEOUSLY

100 SHARES@310,000 YEN
C SECURITIES COMPANY
SECURITIES X=50 SHARES
FUNDS=10,000 YEN
   FIG. 4
PAYMENT INSTRUCTION DIVISION
INVOICE PAYMENT
PAYMENT TIMING
PARTIAL SETTLEMENT
FUND CHECK
DESCRIPTION TO TRANSFER ACCOUNT BOOK
TRADITIONAL OFFSET
NECESSARY
(DIVIDED INTO DIFFERENCE AND OFFSET)
(OFFSET IS PAID BY INVOICE)
OFFSET IS PAID SIMULTANEOUSLY, AND DIFFERENCE IS PAID BY JASDEC
AFTER INSTRUCTION TRANSMISSION
IT MIGHT OCCUR
NOT PERFORM
BOOKING ONLY PART CORRESPONDING TO DIFFERENCE INSTRUCTION
TPC MANAGING APPARATUS
NOT NECESSARY
PAY FOR ALL INSTRUCTIONS SIMULTANEOUSLY
NOT OCCUR SINCE ALL QUANTITIES ARE PAID SIMULTANEOUSLY
PERFORM
BOOKING ACCORDING TO ORIGINAL INSTRUCTION (ON GROSS BASIS)
   FIG. 5
16a OTHER SECURITIES COMPANY APPARATUS
16b OTHER SECURITIES COMPANY APPARATUS
16c OTHER SECURITIES COMPANY APPARATUS
10 FINANCIAL TRANSACTION MANAGEMENT SYSTEM
12 TPC APPARATUS
14 ACCOUNT MANAGING APPARATUS
   FIG. 6
12 TPC APPARATUS
24 COMMUNICATION UNIT
20 CONTROL UNIT
30 TRANSACTION REGISTERING UNIT (INSTRUCTION REGISTERING UNIT)
32 DETERMINING UNIT
34 PAYMENT UNIT
36 PAYMENT HISTORY RECORDING UNIT (INSTRUCTION BOOKING UNIT)
22 STORAGE UNIT
26 TRANSACTION INFORMATION STORAGE UNIT
28 PAYMENT HISTORY STORAGE UNIT (TRANSFER ACCOUNT BOOK)
   FIG. 7
TRANSACTION ID
FIRST ENTITY
B SECURITIES COMPANY
C SECURITIES COMPANY
SECOND ENTITY
FIRST ASSET
SECURITIES X
FIRST TRANSFER QUANTITY
150 SHARES
100 SHARES
SECOND ASSET
MONEY
SECOND TRANSFER QUANTITY
450,000 YEN
310,000 YEN
   FIG. 8
TPC PARTICIPANT (B SECURITIES COMPANY)
ACCOUNT B
BALANCE OF SECURITIES X: 100 SHARES
BALANCE OF FUND: 0 YEN
80 SHARES OF SECURITIES X ON NET IS NECESSARY
70 SHARES@1,500,000 YEN
UPDATE TO 20 SHARES AND 1,500,000 YEN
150 SHARES@3,000,000 YEN
TPC PARTICIPANT (C SECURITIES COMPANY)
ACCOUNT C
BALANCE OF SECURITIES X: 0 SHARES
BALANCE OF FUND: 1,500,000 YEN
1,000,000 YEN OF MONEY ON NET IS NECESSARY
UPDATE TO 80 SHARES AND 500,000 YEN
70 SHARES@2,000,000 YEN
TPC PARTICIPANT (D SECURITIES COMPANY)
ACCOUNT D
BALANCE OF FUND: 1,000,000 YEN
500,000 YEN OF MONEY ON NET IS NECESSARY
UPDATE TO 500,000 YEN
   FIG. 9
TPC PARTICIPANT (SUCH AS B SECURITIES COMPANY
ACCOUNT B-1
BALANCE OF SECURITIES X: 0 SHARES
BALANCE OF FUND: 1,000,000 YEN
200,000 YEN OF MONEY ON NET IS NECESSARY
70 SHARES@1,500,000 YEN
UPDATE TO 800,000 YEN
70 SHARES@1,300,000 YEN
ACCOUNT B-2
BALANCE OF FUND: 0 YEN
SECURITIES X AND MONEY ARE NOT NECESSARY ON NET
UPDATE TO 100,000 YEN
70 SHARES@1,400,000 YEN
ACCOUNT B-3
   FIG. 10
TPC APPARATUS
TPC PARTICIPANT (B SECURITIES COMPANY)
ACCOUNT B
BALANCE OF SECURITIES X: 80 SHARES
BALANCE OF FUND: 0 YEN
80 SHARES OF SECURITIES X ON NET IS NECESSARY
UPDATE TO 0 SHARES AND 1,500,000 YEN
70 SHARES (RECEIVE)@1,500,000 YEN
150 SHARES@3,000,000 YEN
TPC PARTICIPANT (C SECURITIES COMPANY)
ACCOUNT C
BALANCE OF SECURITIES X: 0 SHARES
BALANCE OF FUND: 1,000,000 YEN
1,000,000 YEN OF MONEY ON NET IS NECESSARY
UPDATE TO 50 SHARES AND 0 YEN
100 SHARES (TRANSFER)@2,000,000 YEN
TPC SERVICER
EXCHANGE TRANSFER ACCOUNT
500,000 YEN OF MONEY ON NET IS NECESSARY
→BORROWING IS PERMITTED
UPDATE TO 30 SHARES AND −500,000 YEN
30 SHARES@500,000 YEN
EXCHANGE

The invention claimed is:

1. A financial transaction management computing system, electronically coupled to first and second computing systems of first and second entities, respectively, via a network, the financial transaction management system providing a third party clearing system configured for clearing and settlement of securities purchase and sale transactions, the financial transaction management computing system comprising:
    a communication interface configured to receive first and second transaction information from at least one of the first and second computing systems via the network;
    a non-transitory storage configured to store first and second customer accounts, the first customer account associated with the first entity and including a first quantity of an asset and a first funds balance, the second customer account associated with the second entity and including a second quantity of the asset and a second funds balance, the first and second transaction information respectively indicating first and second transactions of a purchase and sale of the asset transfer between the first entity and the second entity;
    a payment unit configured to make electronic payments associated with the first and second transaction information and to perform simultaneous execution of a face value clearing process therefor;
    a payment history non-transitory storage unit configured to store the electronic payments; and
    a determining unit having a processor configured to:
        receive first and second transaction information from at least one of the first and second computing systems, the first transaction information describing a first transaction including the sale by the first entity of the first quantity of the asset to the second entity in exchange for payment of a first amount of funds paid by the second entity, and the second transaction information describing a second transaction including the sale by the second entity of the second quantity of the asset to the first entity in exchange for a-payment of a second amount of funds paid by the first entity,
        identify the first and second transactions as clearing targets,
        automatically determine whether a net base transaction based on the first transaction and the second transaction is possible by determining that a difference in the quantities and balances remaining in each of the first and second customer accounts as a result of offsetting the first and second transactions is a positive value, the net base transaction being possible even if the quantity or balance in either the first or second customer accounts temporarily has a negative value so long as the difference after the offsetting is a positive value,
        execute the first and second transactions substantially simultaneously, as indicated by the first transaction information on a first gross basis and as indicated by the second transaction information on a second gross basis, upon determining that the net base transaction is possible, even though at least one of the first and second quantities of the asset is insufficient to perform the first and second transactions separately,
        cause the payment unit to execute the payments to the first and second entities by reflecting the payments in account information on a first gross basis and on a second gross basis, respectively, payment on a gross basis including payment of each of the first and second transactions separately without offset or difference, and
        cause the payment history non-transitory storage unit to record the payments associated with the first and second transactions on a gross basis with each transaction separately identifiable.

2. The financial transaction management system according to claim 1,
    wherein the possessed quantity information stored by the storage indicates possessed quantities of a plurality of types of assets held by the first entity and the second entity, and each of the first transaction information and the second transaction information indicates a transaction of more than one of the types of the assets and
    wherein the determining determines whether the net base transaction is possible for each of the types of the assets, and executes the payment when the net base transaction is possible for any of the types of the assets.

3. A financial transaction management computing system coupled to first, second and third computing systems of first, second and third entities, respectively, via a network, the financial transaction management system providing a third party clearing system configured for clearing and settlement of securities purchase and sale transactions, the financial transaction management computing system comprising:
    a communication interface configured to receive first, second and third transaction information from at least one of the first, second and third computing systems via the network;
    a non-transitory storage configured to store first, second and third customer accounts, the first customer account associated with the first entity and including a first quantity of an asset and a first funds balance, the second customer account associated with the second entity and including a second quantity of the asset and a second funds balance, and a third customer account associated with the third entity and including a third quantity of the asset and a third funds balance, the first transaction information indicating a first asset transfer between the first entity and the second entity, the second transaction information indicating a second asset transfer between the second entity and the third entity, and the third transaction information indicating a third asset transfer between the third entity and the first entity;
    a payment unit configured to make electronic payments associated with the first and second transaction information and to perform simultaneous execution of a face value clearing process therefor;
    a payment history non-transitory storage unit configured to store the electronic payments; and
    a determining unit having a processor configured to:
        receive first and second transaction information from at least one of the first and second computing systems, the first transaction information describing a first transaction including the sale by the first entity of the first quantity of the asset to the second entity in exchange for payment of a first amount of funds paid by the second entity, and the second transaction information describing a second transaction including the sale by the second entity of the second quantity of the asset to the first entity in exchange for a-payment of a second amount of funds paid by the first entity,
        identify the first and second transactions as clearing targets, automatically determine whether a net base transaction based on the first transaction, the second transaction, and the third transaction is possible by determining that a difference in the quantities and balances remaining in each of the first, second and third customer accounts as a result of offsetting the first and second transactions is a positive value, the net base transaction being possible even if the quantity or balance in either the first or second customer accounts temporarily has a negative value so long as the difference after the offsetting is a positive value, execute, substantially simultaneously, the first, second and third transactions indicated by the first transaction information, the second transaction information, and the third transaction information, on a gross basis upon determining that the net base transaction is possible, even though at least one of the first, second and third quantities of the asset is insufficient to perform the first, second and third transactions separately, cause the payment unit to execute the payments to the first and second entities by reflecting the payments in account information on a first gross basis and on a second gross basis, respectively, payment on a gross basis including payment of each of the first and second transactions separately without offset or difference, and cause the payment history non-transitory storage unit to record the payments associated with the first and second transactions on a gross basis with each transaction separately identifiable.

4. A financial transaction management method executed by a computer coupled to first and second computing systems of first and second entities, respectively, via a network and providing a third party clearing system configured for clearing and settlement of securities purchase and sale transactions, the computer able to access a non-transitory storage that stores first and second customer accounts, the first customer account associated with the first entity and including a first quantity of an asset and a first funds balance, the second customer account associated with the second entity and including a second quantity of the asset and a second funds balance, the first and second transaction information respectively indicating transactions of a purchase and sale of the asset transfer between the first entity and the second entity, the financial transaction management method comprising:

receiving first and second transaction information from at least one of the first and second computing systems, the first transaction information describing a first transaction including the sale by the first entity of the first quantity of the asset to the second entity in exchange for payment of a first amount of funds paid by the second entity, and the second transaction information describing a second transaction including the sale by the second entity of the second quantity of the asset to the first entity in exchange for payment of a second amount of funds paid by the first entity;

identifying the first and second transactions as clearing targets;

automatically determining whether a net base transaction based on the first transaction and the second transaction is possible by determining that a difference in the quantities and balances remaining in each of the first and second customer accounts as a result of offsetting the first and second transactions is a positive value, the net base transaction being possible even if the quantity or balance in either the first or second customer accounts temporarily has a negative value so long as the difference after the offsetting is a positive value, and executing, substantially simultaneously, the first and second transactions as indicated by the first transaction information on a first gross basis and as indicated by the second transaction information on a second gross basis, when the determining determines that the net base transaction is possible, even though at least one of the first and second quantities of the asset is insufficient to perform the first and second transactions separately;

executing the payments to the first and second entities by reflecting the payments in account information on a first gross basis and on a second gross basis, respectively, payment on a gross basis including payment of each of the first and second transactions separately without offset or difference; and recording the payments associated with the first and second transactions on a gross basis with each transaction separately identifiable.

* * * * *

UNITED STATES PATENT AND TRADEMARK OFFICE
CERTIFICATE OF CORRECTION

Page 1 of 1

PATENT NO. : 11,023,972 B2
APPLICATION NO. : 16/369693
DATED : June 1, 2021
INVENTOR(S) : Hirotaka Hamada et al.

It is certified that error appears in the above-identified patent and that said Letters Patent is hereby corrected as shown below:

In the Claims

Column 15, Line 41:
In Claim 1, delete "a-payment" and insert -- payment --, therefor.

Column 16, Line 64:
In Claim 3, delete "a-payment" and insert -- payment --, therefor.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*